Feb. 18, 1958 E. P. D'AZZO 2,823,885
AWNING ARM BRACKET ASSEMBLY
Filed Nov. 14, 1955 2 Sheets-Sheet 1
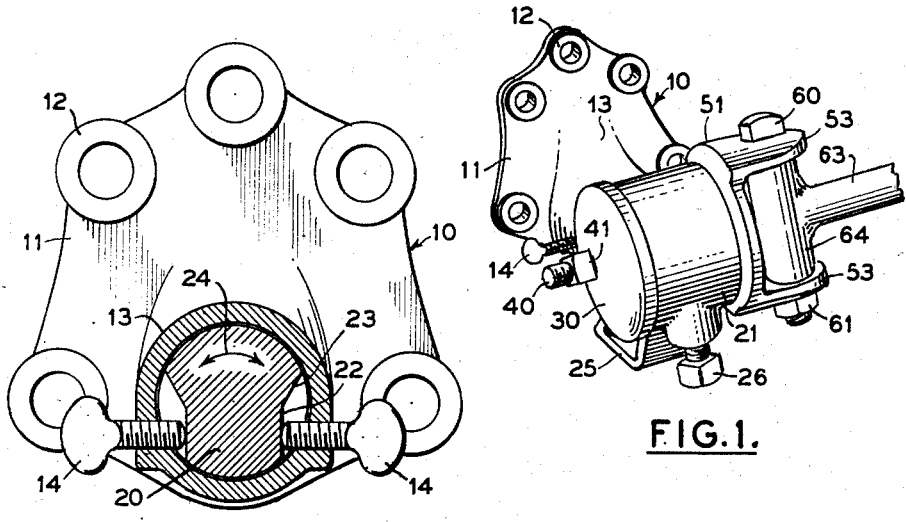
FIG.1.
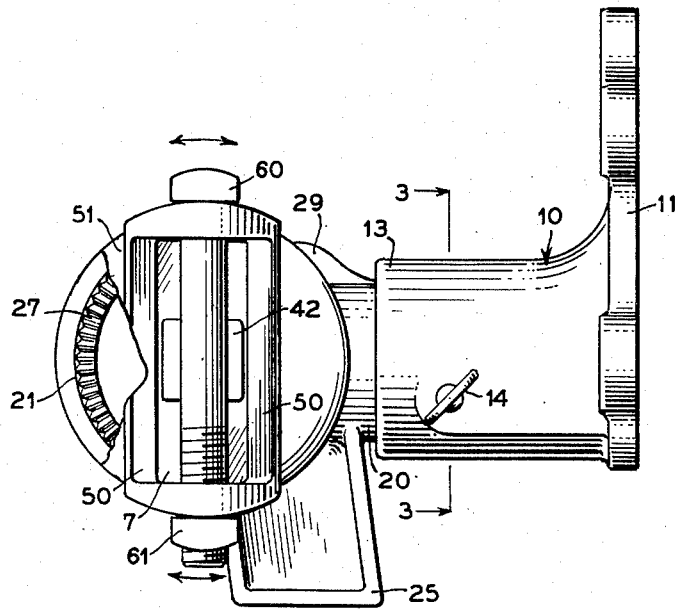
FIG.3.
FIG.2.
INVENTOR.
ERROL P. D'AZZO
BY
J. B. Burke
ATTORNEY Feb. 18, 1958     E. P. D'AZZO     2,823,885
AWNING ARM BRACKET ASSEMBLY
Filed Nov. 14, 1955     2 Sheets-Sheet 2

INVENTOR.
ERROL P. D'AZZO
BY
J. B. Burke
ATTORNEY

2,823,885

AWNING ARM BRACKET ASSEMBLY

Errol P. D'Azzo, Brooklyn, N. Y.

Application November 14, 1955, Serial No. 546,437

7 Claims. (Cl. 248—278)

This invention relates to the art of awning arm brackets and particularly concerns an awning arm bracket assembly having novel adjustment means.

Prior known awning arm brackets have been limited in the range of adjustments possible for awning arms supported thereon. In one known type of bracket horizontal adjustment of the awning arm carried by the bracket has been accomplished by adjusting the position of the bracket on a supporting wall. In another known type of bracket the weight of the arm rests on a single bolt which must be screwed into or out of the awning arm. These types of adjustments are done against the weight of sagging arms and are thus very difficult to accomplish. Also complex mechanical structures are required for the bracket. To adjust the slant of the arm an angularly movable web having a very limited range of movement has been provided.

In the present invention a plural section bracket is provided having a simplified structure with a greater number and range of adjustments than has heretofore been possible.

It is therefore a principal object of the invention to provide an awning arm bracket having simplified horizontal, slant and telescope adjustments.

It is a further object to provide an awning arm bracket having plural adjustment means and permanent locking means for the adjustment means.

It is a further object to provide an awning arm bracket with a telescopic adjustment feature.

It is a further object to provide an awning arm with a cam controlled slant adjustment feature having an extended range of adjustment positions.

It is a further object to provide an awning arm bracket with quick detachable sections.

It is a further object to provide an awning arm bracket with horizontal and slant adjustment means which are independent of the supporting bolts for the bracket.

The invention will be best understood with reference to the following description taken together with the drawings, wherein:

Fig. 1 is an isometric view of an awning arm bracket assembly embodying the invention.

Fig. 2 is a side view of the bracket assembly with a portion cut away to show internal structure.

Fig. 3 is a front sectional view taken on lines 3—3 of Fig. 2.

Figure 6:
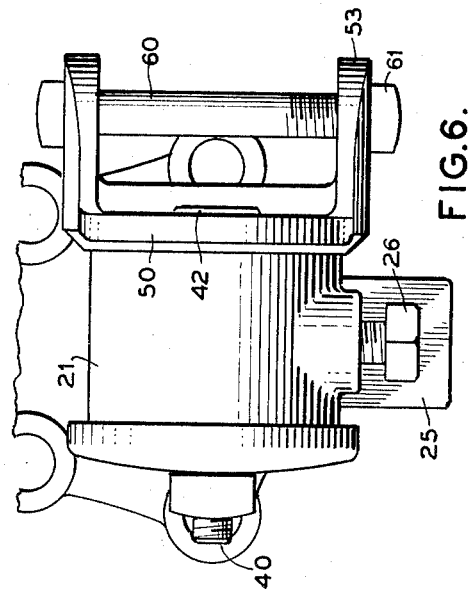
Fig. 6 is a front view of the bracket assembly.

The assembly shown in Figs. 1 through 7 includes a base 10 which has a webbed base plate 11. The plate is provided with five bolt holes 12 for securing the base to a supporting wall such as the wall of a building. Extending outwardly from the plate 11 is hollow cylindrical sleeve 13 which is adapted to receive a telescopic post 20 of a bracket frame member. A pair of aligned wing screws or bolts 14 are threaded in eccentrically disposed aligned apertures in the sides of sleeve 13, with the ends of the screws 14 disposed to engage in pairs of recesses 22 in post 20 as shown in Fig. 3. The pairs of recesses are disposed in spaced array longitudinally along the post. One recess of each pair is so shown in Fig. 7. Each recess 22 is disposed almost diametrically opposite the other recess of a pair as shown in Fig. 3. The recesses have slanted or cammed walls 23 which may coact with screws 14 to permit limited pivotal adjustments of the post 20 and bracket frame as indicated by arrow 24 in Fig. 3. Since the recesses are paired on opposite sides of post 20 and are spaced longitudinally, the bracket frame is capable of limited telescopic adjustment with respect to the base 10.

The bracket frame includes a hollow cylinder 21 integral with post 20. Depending from the post and cylinder 21 and integral therewith is a substantially rectangular boss 25 which serves to reinforce the joint of the cylinder 21 and the post 20. A rib 29 is disposed opposite boss 25 and further reinforces the joint of post and cylinder. A bolt 26 is threaded in an eccentrically disposed threaded hole in the side of the hollow cylinder 21. The lateral rims 27 on each side of the cylinder 21 may be serrated for a purpose to be explained.

A removable cap 30 having a central aperture 31 is provided with a circular channel 35. The cap fits over either rim 27 so that the serrations abut the flat bottom wall of channel 35. A bolt 40 passes axially through the cylinder 21 and aperture 31 of cap 30. Nut 41 on bolt 40 secures the cap 30 to the cylinder 21. The square head 42 of bolt 40 is lodged between walls 50 of a groove in an arm support member 51. The member 51 includes a circular plate 52 having a circular channel 53' similar to the channel 35 in cap 30. The flat wall of channel 53' engages one serrated rim 27 of the cylinder 21 opposite cap 30. Extending outwardly from plate 52 are a pair of arms 53 having apertures 54 for receiving a bolt 60. Nut 61 is threaded on bolt 60. This bolt supports a straight tubular awning arm 63 having a terminal sleeve 64 journaled on bolt 60 as shown in Fig. 1.

Figure 5:
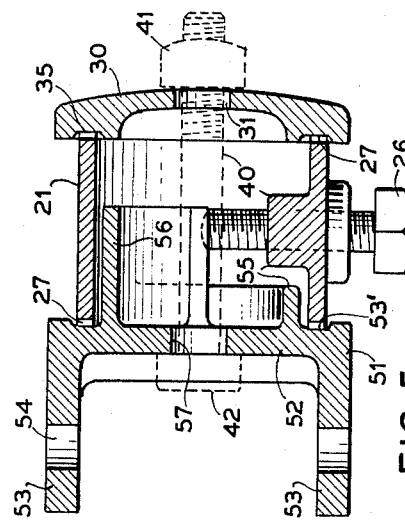
Fig. 5 is a vertical sectional view taken on lines 5—5 of Fig. 4, with certain bolt and nut members omitted.
Figure 7:
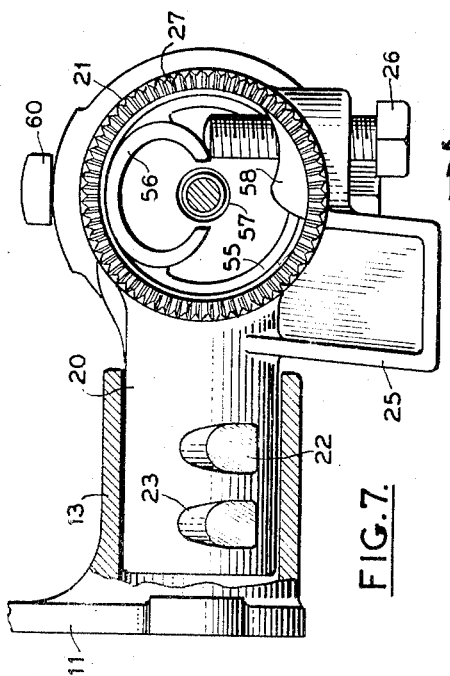
Fig. 7 is a side view taken on a side opposite to that of Fig. 2 with portions of the assembly cut away to show internal structure.
Figure 4:
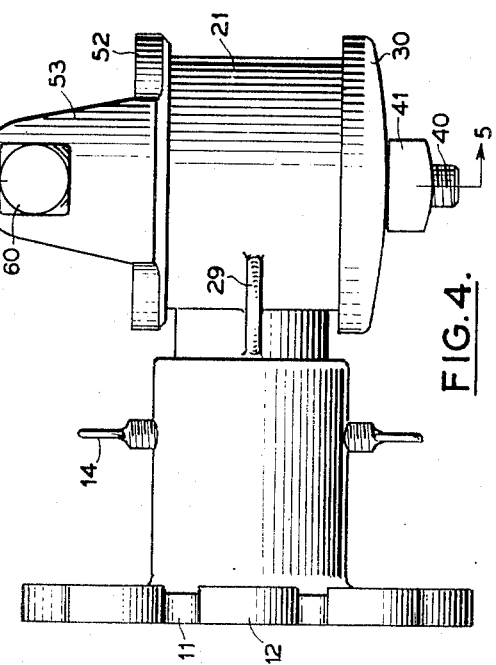
Fig. 4 is a top plan view of the bracket assembly.

Channel 53 has an inner partially circular wall 55 extending outwardly from plate 52. Wall 55 terminates in a C-shaped hollow cam 56. The outer side of the cam completes the inner wall of channel 53'. The open side of the cam is located at the center of member 51, where bolt 40 passes through aperture 57 in plate 52. The cam 56 extends a considerable distance into cylinder 21 as shown in Fig. 5, and at least as far as the threaded end of bolt 26 so that the end of bolt 26 may bear on the side of the cam. Bolt 26 is threaded in a boss integral with the wall of cylinder 21. The boss has an inner projecting portion 58 whose function is described later.

To install the bracket for use as an awning arm support, base 10 is first attached to a suitable vertical supporting wall by means of suitable bolts (not shown) inserted through bolt holes 12. The post 20 is preferably withdrawn from sleeve 13 at this time to facilitate positioning the base plate 11. Next the post 20 of the bracket frame member is inserted telescopically in sleeve 13. Since the post may be located so that either pair of recesses 22 is aligned with the pair of screws 14, this telescopic positioning of the post is the initial adjustment to be made. Next the horizontal positioning of arm 63 is accomplished. This is done by rotating post 20 in sleeve 13 angularly a few degrees to the right or left with both screws 14 threaded out of engagement with recesses 22, until the arm 63 is properly leveled. Then the screws 14 are threaded into recesses 22. Tightening one screw will set the angular position of the post.

Tightening the other screw 14 will lock the adjustment permanently. This adjustment is best done with bolt 60 as close to vertical as possible. The angular adjustment of the bracket member and to post as just described will compensate for any sagging of arm 63 from a horizontal plane, with the arm extending in a direction substantially parallel to base plate 11. When the horizontal adjustment is made cap 30 and arm support member 51 should be assembled on cylinder 21 as shown in Fig. 1. Now the arm 63 may be pivoted outwardly on bolt 60 to a plane perpendicular to the base plate 11. It will generally be found that the arm slants too far upwardly or downwardly in this extended position and must be given some slant adjustment. Sometimes the particular awning installation requires that when the awning arm is extended outwardly, the arm slant up or down from the horizontal by as much as forty-five degrees. Prior known awning arm brackets have not been capable of this much angular adjustment and have necessitated relocating of the entire bracket on the supporting wall which is a very difficult and time consuming operation. If this repositioning was not possible, the awning often had to be redesigned. In the present bracket structure the slant adjustment is readily made through a range of at least ninety angular degrees.

To make the slant adjustment, nut 41 on bolt 40 is loosened and bolt 26 is turned until it projects suitable distance into cylinder 21. The support member is pivoted angularly until some portion of the outer wall of cam 56 rests on the inner end of bolt 26. The curvature of cam 56 is such that as the bolt 26 is screwed more or less into cylinder 21, a different point of cam 56 rests on the end of the bolt and the bolt 60 assumes a corresponding angular position with respect to the vertical while the outwardly extending arm 63 is elevated to the desired slant position. Once the desired slant is obtained for arm 63, nut 41 is tightened. This causes both cap 30 and plate 52 to be locked against the serrated rims of cylinder 21. This relieves somewhat the pressure of cam 56 on the end of bolt 26 since the engagement of the serrated rims 27 with the flat inner walls of channels 32 and 53' bear substantially the entire load of the outwardly extending arm.

It will thus be noted that for each adjustment of bracket assembly means are provided for positioning the several members and then locking them in position.

A particularly important feature is the arrangement whereby the base 10 is separable from the remainder of the bracket assembly. If this bracket assembly is to be mounted within a conventional awning box where space is very limited since such a box is often just large enough to hold a rolled up canvas awning, the base plate in the present invention may easily be located in the limited space behind the awning while the remainder of bracket assembly may project outwardly any desired distance because of the telescopic adjustment of post 20 as described above.

The several parts of the bracket are each of simple but rugged design. They may be made of hardened wrought iron, of aluminum or of any suitable combinations of metals as found appropriate. The entire structure is intended for heavy duty use. The assembly may be installed with the simplest of tools, such as a single wrench, and once the adjustments are made they remain so permanently. Of course if readjustments became necessary, they may be made very readily by loosening the necessary bolts, repositioning the parts and locking them in position again.

It should be noted that in the present structure, the arm 63 can always be made horizontal regardless of the angular inclination from a vertical position of the central axis of plate 11. Also in the slant adjustment a full 90 degree range of adjustment is possible without detaching and reattaching members of the bracket assembly as has been required heretofore in prior known awning arm supports.

Although only a single embodiment of the invention has been disclosed it will be apparent to those skilled in the art, that many changes and modifications are possible without departing from the invention as defined by the appended claims.

What is claimed and sought to be protected by Letters Patent of the United States is:

1. An awning arm bracket assembly, comprising a pair of separable sections, one of said sections having an apertured base plate with a sleeve upstanding therefrom, said sleeve having a pair of threaded apertures disposed eccentrically therein; another of said sections comprising a post disposable in said sleeve, said post having pairs of recesses disposed thereon for engaging screws threaded in the apertures in said sleeve to adjust the post telescopically and angularly with respect to said plate, and a hollow cylindrical member at right angles and integral with said post, said member having a threaded hole in the side thereof; and a pair of circular plates having annular channels engaged on opposite rims of said member, one of said circular plates having upstanding arms on one side thereof for supporting a pivotable awning arm, and having a cam member on the other side of said one plate, said cam member extending into said cylindrical member for engagement with a bolt threaded through the side of said cylindrical member, whereby the awning arm is adjustable slantwise with respect to said base plate.

2. An awning arm bracket assembly according to claim 1, wherein said rims have serrations thereon.

3. An awning arm bracket assembly, comprising a pair of separable sections, one of said sections having a base plate with a sleeve upstanding therefrom, said sleeve having a pair of threaded apertures disposed eccentrically therein; another of said sections comprising a post disposable in said sleeve, said post having pairs of recesses disposed thereon for engaging screws threaded in the apertures in said sleeve to adjust the post telescopically and angularly with respect to said plate, and a hollow cylindrical member at right angles and integral with said post, said member having a threaded hole in the side thereof; and a pair of circular plates having upstanding arms on one side thereof for supporting a pivotable awning arm, and having a cam member on the other side of said one plate, said cam member extending into said cylindrical member for engagement with a bolt threaded through the side of said cylindrical member, whereby the awning arm is adjustable slantwise with respect to said base plate, said circular plates having centrally disposed apertures therein, there being a bolt passing through said centrally disposed apertures and said cylindrical member and carrying a nut for securing the circular plates to the cylindrical member.

4. An awning arm bracket assembly, comprising a pair of separable sections, one of said sections having a base plate with a sleeve upstanding therefrom, said sleeve having a pair of threaded apertures disposed eccentrically therein; another of said sections comprising a post disposable in said sleeve, said post having pairs of recesses disposed thereon for engaging screws threaded in the apertures in said sleeve to adjust the post telescopically and angularly with respect to said plate, and a hollow cylindrical member at right angles and integral with said post, said member having a threaded hole in the side thereof; a pair of circular plates having annular channels engaged on opposite rims of said member, one of said circular plates having upstanding arms on one side thereof, and having a cam member on the other side of said one plate, said cam member extending into said cylindrical member for engagement with a bolt threaded through the side of said cylindrical member, whereby the awning arm is adjustable slantwise with respect to said base plate, said arms having apertures therein, and a bolt passing through the apertures in said arms for engagement with and pivotally supporting an awning arm.

5. An awning arm bracket assembly, comprising a pair of separable sections, one of said sections having a base plate with a sleeve upstanding therefrom, another of said sections comprising a post disposable in said sleeve, said post and sleeve being provided with means to adjust the post telescopically and angularly with respect to said plate, and a hollow cylindrical member at right angles and integral with said post; and a pair of circular plates engaged on opposite rims of said member, one of said circular plates having upstanding arms on one side thereof for supporting a pivotable awning arm, said one plate and cylindrical member being provided with coacting screw-cam means arranged to adjust said one plate on said cylindrical member.

6. An awning arm bracket assembly, comprising a pair of separable sections, one of said sections having a base plate with a sleeve upstanding therefrom; another of said sections comprising a post disposable in said sleeve, said post and sleeve being provided with means to adjust the post telescopically and angularly with respect to said plate, and a hollow cylindrical member at right angles and integral with said post, said member having a threaded hole in the side thereof; and a pair of circular plates engaged on opposite rims of said member, one of said circular plates having upstanding arms on one side thereof for supporting a pivotable awning arm, and having a cam member on the other side of said one plate, said cam member extending into said cylindrical member for engagement with a bolt threaded through the side of said cylindrical member, whereby the awning arm is adjustable slantwise with respect to said base plate.

7. An awning arm bracket assembly, comprising a pair of separable sections, one of said sections having a base plate with a sleeve upstanding therefrom, said sleeve having a pair of threaded apertures disposed eccentrically therein; another of said sections comprising a post disposable in said sleeve, said post having pairs of recesses disposed thereon for engaging screws threaded in the apertures in said sleeve to adjust the post telescopically and angularly with respect to said plate, and a hollow cylindrical member at right angles and integral with said post, said member having a threaded hole in the side thereof; and a pair of circular plates engaged on opposite rims of said member, one of said circular plates having upstanding arms on one side thereof for supporting a pivotable awning arm, said one plate and cylindrical member being provided with coacting screw-cam means arranged to adjust said one plate on said cylindrical member.

References Cited in the file of this patent
UNITED STATES PATENTS

| | | |
|---|---|---|
| 937,480 | Smith et al. | Oct. 19, 1909 |
| 1,031,075 | Lundin | July 2, 1912 |
| 1,248,592 | Anderson | Dec. 4, 1917 |
| 1,842,224 | Wells | Jan. 19, 1932 |